Jan. 17, 1961     A. WACHTEL     2,968,627
ELECTROLUMINESCENT PHOSPHOR AND METHOD
Filed Feb. 12, 1958
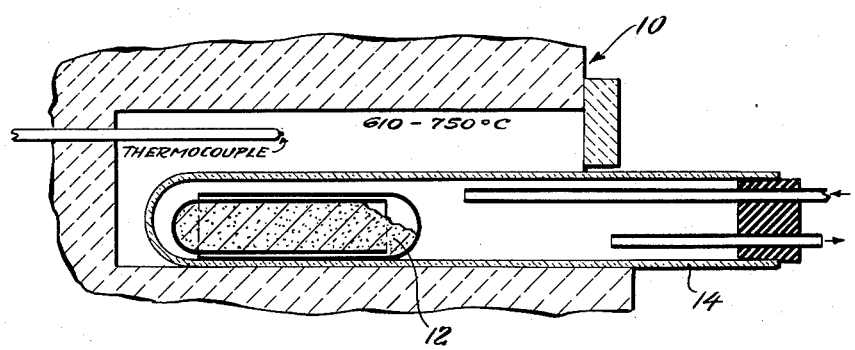
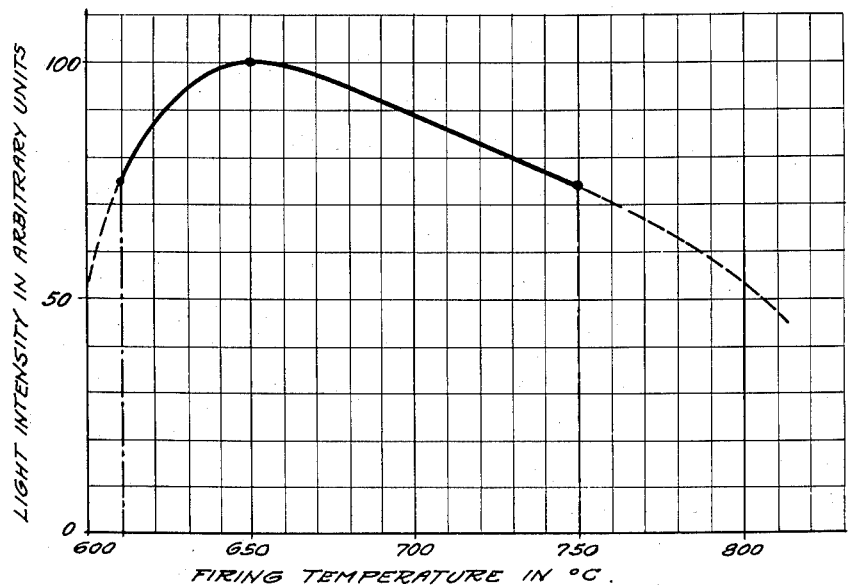
INVENTOR.
ANSELM WACHTEL.
BY W. D. Palmer
ATTORNEY.

United States Patent Office 2,968,627
Patented Jan. 17, 1961

2,968,627
ELECTROLUMINESCENT PHOSPHOR
AND METHOD

Anselm Wachtel, Parlin, N.J., assignor to Westinghouse Electric Corporation, East Pittsburgh, Pa., a corporation of Pennsylvania Filed Feb. 12, 1958, Ser. No. 714,868
8 Claims. (Cl. 252—301.6)

This invention relates to electroluminescent phosphors and, more particularly, to a zinc-cadmium sulfide electroluminescent phosphor and to a method for preparing same.

The phenomenon of electroluminescence was comprehensively disclosed in G. Destriau article appearing in London, Edinburgh and Dublin Philosophical magazine, Series 7, volume 38, No. 285, pages 700–737 (October 1947). A recent complete summary of electroluminescence is also given in Destriau and Ivey article, titled "Electroluminescence and Related Topics," proceedings of the I.R.E., volume 43, No. 12, pages 1911 to 1940 (December 1955). In the phenomenon of electroluminescence, selected phosphor materials are placed within the influence of an electric field, which field renders these materials light emitting. Copper-activated zinc-sulfide phosphor is the most-common electroluminescent material and this phosphor is generally blue or green emitting for any given frequency of excitation, depending upon the activator and coactivator concentration.

In the phenomenon of electroluminescence, it is desirable to achieve different color effects, as in other lighting applications. Yellow-emitting electroluminescent phosphors have been previously reported, such as manganese- and copper-activated zinc sulfide phosphor. Another phosphor having a relatively large amount of red emission in its electroluminescent response is zinc selenide. The previously-reported manganese- and copper-activated zinc sulfide phosphors have had fairly poor output and it is desirable to avoid the use of selenides because of their reported toxicity.

It is the general object of this invention to avoid and overcome the foregoing and other difficulties of and objections to prior-art practices by the provision of a copper-activated zinc-cadmium sulfide electroluminescent phosphor which has a yellowish emission with good brightness.

It is a further object to provide a method for preparing a copper-activated zinc-cadmium sulfide electroluminescent phosphor which has a yellowish electroluminescent emission with good brightness.

The aforesaid objects of the invention, and other objects which will become apparent as the description proceeds, are achieved by providing a method of changing from green to yellowish the electroluminescent emission of copper-activated zinc-sulfide electroluminescent phosphor. This is accomplished by admixing with such finely-divided, zinc sulfide phosphor from about 5 to about 19 molar percent of cadmium sulfide. This admixture is fired in an inert atmosphere, which preferably includes some sulphur vapor, at a temperature of from 610° C. to 750° C. for at least ⅓ hour and preferably for from 1 to 4 hours. The resulting zinc-cadmium sulfide phosphor comprises finely-divided particles which are interiorly predominately zinc sulfide and exteriorly rich in cadmium sulfide.

For a better understanding of the invention, reference should be had to the accompanying drawing wherein:

Fig. 1 illustrates a sectional view of a firing furnace suitable for preparing the instant phosphor;

Fig. 2 is a graph of light intensity in arbitrary units versus phosphor firing temperature.

Copper-activated zinc-cadmium sulfide electroluminescent phosphors have previously been reported as in Patent No. 2,698,915 to Piper and Patent No. 2,782,168 to Fetters. Such phosphors are poorly electroluminescent, however, where more than about 4 mole percent of cadmium is included. Additions of more than about 4 mole percent of cadmium to the usual green-emitting, copper-activated zinc sulfide electroluminescent phosphor causes a very sharp drop in electroluminescent brightness and in addition, the color shifts from the green toward the blue-green. Such a color shift is opposite to that which is desired. Green-electroluminescing, copper-activated zinc sulfide phosphors are very well known and such phosphors are described in copending application of Willi Lehmann, Serial No. 630,354, filed December 24, 1956, titled "Phosphor," in copending application of A. Wachtel, the inventor herein, S.N. 630,352, filed December 24, 1956, now Patent No. 2,874,128, and in copending application of A. Wachtel, the inventor herein, S.N. 630,353, filed December 24, 1956, all owned by the present assignee. As an example, such a phosphor may be prepared by admixing finely-divided zinc sulfide and copper chloride in amount of 0.01 gram mole of copper chloride per mole of zinc sulfide. This admixture may be fired in an atmosphere comprising sulphur vapor at a temperature of about 900° C. for about 1 hour, for example. This will produce an excellent green-emitting electroluminescent phosphor. The preparation of this phosphor may be modified such as by substituting copper iodide or bromide with additional ammonium or zinc iodide or bromide, if desired, for the copper chloride or by admixing these compounds, such as equal parts of copper chloride and copper bromide. Also, aluminum may be substituted either in part or in whole for the halogen, such as by providing the copper in the indicated gram-atom amount in the form of the acetate, for example, and admixing aluminum in the form of the nitrate in amount of 0.01 gram mole, for example. Green electroluminescent phosphors are also disclosed by Zalm, "Philips Research Reports," volume 9, No. 2, April 1954, pages 81–108 and in U.S. Patent No. 2,755,255 to Beutler et al.

In order to produce a copper-activated zinc sulfide green electroluminescent phosphor, it is necessary to provide a coactivating constituent, which has been called a flux in some cases, in order to cause the copper activator to be incorporated into the phosphor matrix. Suitable coactivators to cause the copper activator to be incorporated are chlorine, bromine, iodine or aluminum or mixtures thereof, as noted hereinbefore. These coactivating materials are all common in that they balance or compensate the charges within the phosphor matrix. In the case of the "coactivating halogens," all have a "minus one" valency and they are introduced so that a "plus one" cuprous ion and a "plus two" zinc ion will have the exact opposite charge as the "minus one" halogen ion and a "minus two" sulphur ion. Thus the charges in the phosphor matrix are compensated or balanced and such a charge compensation effect has been found necessary to produce the usual green copper-activated zinc sulfide electroluminescent phosphor. In the case of the "plus three" aluminum coactivator, a "plus three" aluminum ion and a "plus one" cuprous ion will be compensated in charge by two "minus two" sulphur ions and the charges are thus compensated. While the explanation for this so-called charge compensation is only theoretical, it is substantiated by much practical experience and when one refers to a copper-activated zinc sulfide electroluminescent phosphor, the inclusion of the coactivating constituent is understood, whether it is described as a coactivator or as a flux, for example.

While the instant phosphor may be prepared from any of the copper-activated zinc sulfide green electroluminescent phosphors as described hereinbefore, it is preferred to utilize the green electroluminescent phosphor described in heretofore mentioned, copending Lehmann application S.N. 630,354, filed December 24, 1946. For good results such a phosphor should contain copper in amount of from 0.45 to 1.1 gram-atom percent of the zinc sulfide and at least one of the group consisting of chlorine, bromine, iodine or aluminum in amount of from 0.11 to 0.65 gram-atom percent of the zinc sulfide, with the preferred coactivator constituent being chlorine. Optimum results have been obtained where the copper is present in amount of about 0.9 gram-atom percent of the zinc sulfide and coactivator, preferably chlorine, is present in amount of about 0.32 gram-atom percent of the zinc sulfide.

The usual green electroluminescent phosphor is desirably washed in an aqueous solution which is a solvent for cuprous sulfide but which is not a solvent for zinc sulfide, in order to obtain the best results. Such solvents may comprise a one-normal solution of a water-soluble cyanide such as sodium cyanide, potassium cyanide or ammonium cyanide or any mixtures thereof, a water soluble thiosulphate such as sodium thiosulphate, potassium thiosulphate or ammonium thiosulphate or any mixtures thereof, or a water soluble thiocyanate such as sodium thiocyanate, potassium thiocyanate or ammonium thiocyanate or any mixtures thereof. As an example, equal amounts of the sodium and potassium compounds may be used. In accordance with the instant teachings, the green electroluminescent phosphors as described hereinbefore are first reduced to finely-divided status, such as by a gentle crushing, but are not washed with the cuprous-sulfide-solvent washing solution. The particle size of the finely-divided, zinc sulfide phosphor is in no way critical and may vary over an extremely wide range, although particle agglomerates are desirably suppressed. As an example, the unwashed green electroluminescent zinc sulfide phosphor may have an average particle size of about 25 microns.

To produce the instant yellowish-emitting electroluminescent phosphor, finely-divided cadmium sulfide may be admixed with the unwashed, finely-divided green electroluminescent copper-activated zinc sulfide phosphor. The state of division of the finely-divided cadmium sulfide and the method of preparation of this compound are not critical. Desirably the ultimate size of the cadmium sulfide particles is appreciably smaller than the ultimate size of the zinc sulfide particles in order that the comparatively-small cadmium sulfide particles will act to surround the zinc sulfide particles and it has been found convenient to use precipitated cadmium sulfide having an average particle size less than 1 micron, for example. From about 5 to about 19 molar percent of cadmium sulfide, and preferably from about 10 to about 17 molar percent of cadmium sulfide, may be admixed with the electroluminescent zinc sulfide and this admixture may be placed into a standard firing container adapted to fit into a firing furnace 10, such as shown in Fig. 1. The firing furnace 10 may comprise any standard furnace and the phosphor admixture is inserted into a telescoping firing container 12 which may comprise two silica tubes having a sufficiently snug fit that the container is essentially closed to convection of exterior gases, but will still allow the escape of any positive gas pressures generated therein during firing. As an example, about 9.0 grams of the green electroluminescent zinc sulfide phosphor and 1.48 grams of cadmium sulfide may be admixed and introduced into the firing container 12, which may have a volume of 13.5 cc., for example. It is preferred to add a small amount of sulphur to the phosphor and cadmium sulfide admixture and this may be accomplished by adding 0.5 gram of sulphur, for example, to the admixture before it is inserted into the container 12. The amount of sulphur is in no way critical and is only intended to provide an atmosphere which includes sulphur vapor. The container 12 is then inserted into an outer silica firing tube 14, which is stoppered at its open end and is provided with an inlet and outlet through which inert gas may be flushed during the firing. As an example, nitrogen may be flushed throughout the container during the firing at a rate of 150 cc. per minute. As a second example 8.38 grams of copper-activated, green electroluminescent zinc sulfide phosphor may be admixed with 2.07 grams of cadmium sulfide and fired under conditions as given herein.

It is necessary that the firing be carried out in an inert atmosphere and while nitrogen has been used for the sake of convenience, any other inert gas such as the noble gases may be substituted, if desired. In addition, while the firing is preferably conducted in an inert atmosphere which includes sulphur vapor, the addition of the sulphur vapor is not necessary and the firing may be conducted only in an inert atmosphere, if desired.

The firing temperatures which may be used in preparing the instant phosphor are from 610° C. to 750° C. and the preferred firing temperature is about 650° C. It should be noted that these firing temperatures are well below those which are normally used in preparing electroluminescent phosphors. In Fig. 2 is shown the effect of varying the firing temperature for the instant phosphor wherein the light output, expressed in arbitrary units, obtained after the phosphor is prepared is plotted versus firing temperature. At the extremes of the permissible firing temperature, the output of the resulting phosphor has dropped off to 75% of the maximum value which is obtained at the preferred firing temperature of about 650° C. and the output thereafter drops off in a rapid fashion. The minimum firing time is 20 minutes and the firing time desirably is from 1 to 4 hours. Prolonged firings within the indicated temperature range do not appear to effect the output appreciably.

After firing, the phosphor desirably is cooled within the firing container while maintaining the inert gas flush and the cooled phosphor is thereafter lightly crushed and desirably is washed with any of the cuprous-sulfide solvents as indicated hereinbefore, desirable removing any heavy residue which may be dark colored. These washing materials are not solvents for cadmium sulfide or zinc sulfide. The concentration of this wash is not particularly critical and may vary over a wide range, although the one-normal concentration as indicated has been found to be very suitable. Thereafter residual wash solution is desirably removed as by a water wash, the phosphor is dried and then may be incorporated into an electroluminescent cell by the usual techniques.

The greater the amount of cadmium which is incorporated into a phosphor, the more the output is shifted from the green toward the red. Following is a table designated "Table I" which tabulates performance data taken for the instant phosphor as given in the foregoing examples, for the green electroluminescent phosphor as disclosed in heretofore-mentioned copending Lehmann application, Serial No. 630,345, filed December 24, 1956, and for a typical yellow-electroluminescent phosphor which comprises zinc sulfide activated by copper and manganese.

*Table I*

| | Brightness (Arbitrary Units) | Red Emission (Arbitrary Units) |
| --- | --- | --- |
| Green Phosphor ZnS:Cu | 220 | 18 |
| ZnCdS:Cu (11 mole percent CdS) | 120 | 25 |
| ZnCdS:Cu (16.6 mole percent CdS) | 74 | 23 |
| ZnS:Cu:Mn | 30 | 14 |

NOTE.—Brightness and red emission measurements were made with a "Spectra" Brightness Spot Meter manufactured by Photo Research Corp., Hollywood, California.

In the foregoing table the relative percentage of "red emission" indicates the amount of color shift toward the longer wave lengths. It will be observed that the emission of the instant phosphor is not quite as yellow as the copper- and manganese-activated zinc sulfide electroluminescent phosphor, but the total light output is much greater with a greater output in the red. Where a smaller amount of cadmium sulfide is utilized within the indicated ranges, the phosphor is considerably more red than the best green phosphor which was initially used before admixing with the cadmium sulfide and fired as described hereinbefore. As the cadmium content increases, the light output drops off somewhat, but the red emission increases.

The instant phosphor does not merely comprise a mixture of photoluminescent cadmium sulfide and green electroluminescent zinc sulfide, wherein the cadmium sulfide converts some of the green emission of the zinc sulfide to longer wave lengths in order to shift the composite emission toward the red. In conducted experiments, a green electroluminescent phosphor, as hereinbefore specified, was admixed with an orange-emitting photoluminescent, copper-activated zinc-cadmium sulfide phosphor in proportion such that the color of the U.V. excited fluorescence of the admixture approximated that of the instant phosphor. On electroluminescent excitation of this admixture, however, the emission color was still substantially green with no shift toward the yellow, although the brightness was somewhat decreased. Further tests have been conducted wherein the instant phosphor as prepared was placed into a five-normal solution of HCl, which solution is a solvent for the phosphor. Where the phosphor was exposed to this solvent for only a short time, the emission was shifted back toward the green only a relatively small amount. Where the instant phosphor was allowed to remain within the solvent solution for progressively longer periods, the emission of the resulting phosphor was shifted more and more toward the green. It is thus apparent that the resulting phosphor comprises finely-divided zinc-cadmium sulfide, the individual particles of which are interiorly predominantly green-electroluminescent zinc sulfide and the exterior portions of which particles are rich in cadmium sulfide.

Summarizing the instant phosphor, it comprises finely-divided zinc-cadmium sulfide, the individual particles of which are interiorly predominantly zinc sulfide and exteriorly rich in cadmium sulfide. The molar percent of cadmium sulfide to zinc sulfide is from about 5 to about 19 and preferably is from about 10 to about 17 for best color shift. The phosphor should contain copper in amount of from 0.45 to 1.1 gram-atom percent of the zinc sulfide and at least one of the group consisting of chlorine, bromine, iodine or aluminum in amount of 0.11 to 0.65 gram-atom percent, and preferably 0.32 gram-atom percent of the zinc sulfide. The preferred copper concentration is about 0.9 gram-atom percent of the zinc sulfide and the preferred coactivating material which is chlorine is desirably present in amount of about 0.32 gram-atom percent of the zinc sulfide. Small impurities of zinc oxide may be tolerated and will normally occur in most copper-activated zinc sulfide electroluminescent phosphors. Small amounts of other impurities such as alkaline-earth metals, etc. may also be tolerated.

Summarizing the method for preparing the instant phosphor, any good green-electroluminescent, copper-activated zinc sulfide phosphor may be used as a starting material and such phosphors are well known in the art. There is admixed with this finely-divided phosphor from about 5 to about 19 molar percent of the zinc sulfide of finely-divided cadmium sulfide, with the preferred amount of cadmium sulfide being from about 11 to about 17 molar percent of the zinc sulfide. This admixture is fired in an inert atmosphere at from 610° C. to 750° C. for at least ⅓ hour with the preferred firing temperature being about 650° C. and the preferred firing time being from one to four hours. Thereafter it is desirable, although not mandatory, to wash the fired admixture in a solution which is a solvent for cuprous sulfide, but which is not a solvent for zinc or cadmium sulfide.

It will be recognized that the objects of the invention have been achieved by providing a copper-activated zinc-cadmium sulfide electroluminescent phosphor which has a yellowish emission with good brightness and by providing a method for changing from green to yellowish the electroluminescent emission of finely-divided, copper-activated zinc sulfide phosphor.

While best-known embodiments of the invention have been illustrated and described in detail, it is to be particularly understood that the invention is not limited thereto or thereby.

I claim:

1. The method of changing from green to yellowish the electroluminescent emission of cuprous-sulfide-solvent unwashed, finely-divided, copper-activated zinc sulfide phosphor containing copper in amount of from 0.45 to 1.1 gram-atom percent of the zinc sulfide and at least one of the group consisting of chlorine, bromine, iodine and aluminum in amount of from 0.11 to 0.65 gram-atom percent of the zinc sulfide, which method comprises: admixing with said phosphor from about 5 to about 19 molar percent of the zinc sulfide of finely-divided cadmium sulfide; and firing said admixture in an inert atmosphere at from 610° C. to 750° C. for at least ⅓ hour.

2. The method of changing from green to yellowish the electroluminescent emission of cuprous-sulfide-solvent unwashed, finely-divided, copper-activated zinc sulfide phosphor containing copper in amount of from 0.45 to 1.1 gram-atom percent of the zinc sulfide and at least one of the group consisting of chlorine, bromine, iodine and aluminum in amount of from 0.11 to 0.65 gram-atom percent of the zinc sulfide, which method comprises: admixing with said phosphor from about 5 to about 19 molar percent of the zinc sulfide of finely-divided cadmium sulfide; and firing said admixture in an inert atmosphere at from 610° C. to 750° C. for at least ⅓ hour; thereafter washing said fired admixture in a solution which is a solvent for cuprous sulfide but which is not a solvent for zinc and cadmium sulfides.

3. The method of changing from green to yellowish the electroluminescent emission of cuprous-sulfide-solvent unwashed, finely-divided, copper-activated zinc sulfide phosphor containing copper in amount of from 0.45 to 1.1 gram-atom percent of the zinc sulfide and at least one of the group consisting of chlorine, bromine, iodine and aluminum in amount of from 0.11 to 0.65 gram-atom percent of the zinc sulfide, which method comprises: admixing with said phosphor from about 5 to about 19 molar percent of the zinc sulfide of finely-divided cadmium sulfide; and firing said admixture in an inert atmosphere including sulphur vapor at from 610° C. to 750° C. for at least ⅓ hour; thereafter washing said fired admixture in a solution which is a solvent for cuprous sulfide but which is not a solvent for zinc and cadmium sulfides.

4. The method of changing from green to yellowish the electroluminescent emission of cuprous-sulfide-solvent unwashed, finely-divided, copper-activated zinc sulfide phosphor containing copper in amount of from 0.45 to 1.1 gram-atom percent of the zinc sulfide and at least one of the group consisting of chlorine, bromine, iodine and aluminum in amount of from 0.11 to 0.65 gram-atom percent of the zinc sulfide, which method comprises: admixing with said phosphor from about 11 to about 17 molar percent of the zinc sulfide of finely-divided cadmium sulfide; and firing said admixture in an inert atmosphere including sulphur vapor at about 650° C. for about 1 to 4 hours; thereafter washing said fired admixture in a solution which is a solvent for cuprous sulfide but which is not a solvent for zinc and cadmium sulfide.

5. A yellow-emitting copper-activated zinc-cadmium sulfide electroluminescent phosphor comprising, finely-divided zinc-cadmium sulfide the individual particles of which are interiorly predominately zinc sulfide and exteriorly rich in cadmium sulfide, the molor percent of cadmium sulfide to zinc sulfide being from about 5 to about 19 and said phosphor containing copper in amount of from 0.45 to 1.1 gram-atom percent of the zinc sulfide and at least one of the group consisting of chlorine, bromine, iodine and aluminum in amount of from 0.11 to 0.65 gram-atom percent of the zinc sulfide.

6. A yellow-emitting copper-activated zinc-cadmium sulfide electroluminescent phosphor comprising, finely-divided zinc-cadmium sulfide the individual particles of which are interiorly predominately zinc sulfide and exteriorly rich in cadmium sulfide, the molor percent of cadmium sulfide to zinc sulfide being from about 11 to about 17, and said phosphor containing copper in amount of from 0.45 to 1.1 gram-atom percent of the zinc sulfide and at least one of the group consisting of chlorine, bromine, iodine and aluminum in amount of from 0.11 to 0.65 gram-atom percent of the zinc sulfide.

7. A yellow-emitting copper-activated zinc-cadmium sulfide electroluminescent phosphor comprising, finely-divided zinc-cadmium sulfide the individual particles of which are interiorly predominately zinc sulfide and exteriorly rich in cadmium sulfide, the molor percent of cadmium sulfide to zinc sulfide being from about 11 to about 17, and said phosphor containing copper in amount of about 0.9 gram-atom percent of the zinc sulfide and at least one of the group consisting of chlorine, bromine, iodine and aluminum in amount of about 0.32 gram-atom percent of the zinc sulfide.

8. A yellow-emitting copper-activated zinc-cadmium sulfide electroluminescent phosphor comprising, finely-divided zinc-cadmium sulfide the individual particles of which are interiorly predominately zinc sulfide and exteriorly rich in cadmium sulfide, the molor percent of cadmium sulfide to zinc sulfide being from about 11 to about 17, and said phosphor containing copper in amount of about 0.9 gram-atom percent of the zinc sulfide and chlorine in amount of about 0.32 gram-atom percent of the zinc sulfide.

References Cited in the file of this patent

UNITED STATES PATENTS

| | | |
|---|---|---|
| 2,352,035 | Strubig | June 20, 1944 |
| 2,397,666 | Isenberg | Apr. 2, 1946 |
| 2,402,759 | Leverenz | June 25, 1946 |
| 2,504,674 | Fonda | Apr. 18, 1950 |
| 2,698,915 | Piper | Jan. 4, 1955 |